April 3, 1962 A. J. SORCHY 3,028,512
DRIVE RELEASED MOTOR BRAKE
Filed July 9, 1958 2 Sheets-Sheet 1

INVENTOR.
ANTHONY J. SORCHY
BY
ATTORNEYS.

April 3, 1962 — A. J. SORCHY — 3,028,512
DRIVE RELEASED MOTOR BRAKE
Filed July 9, 1958 — 2 Sheets-Sheet 2
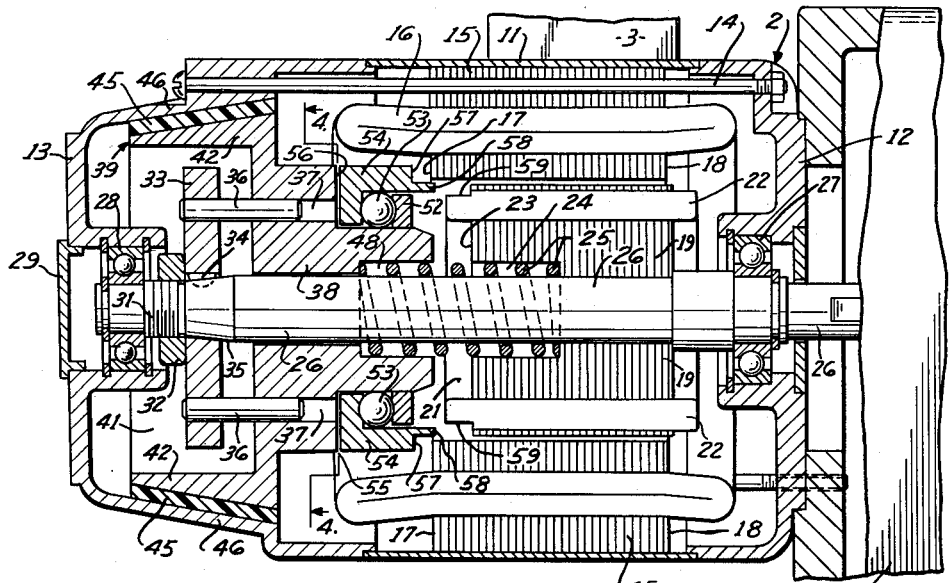
Fig. 2
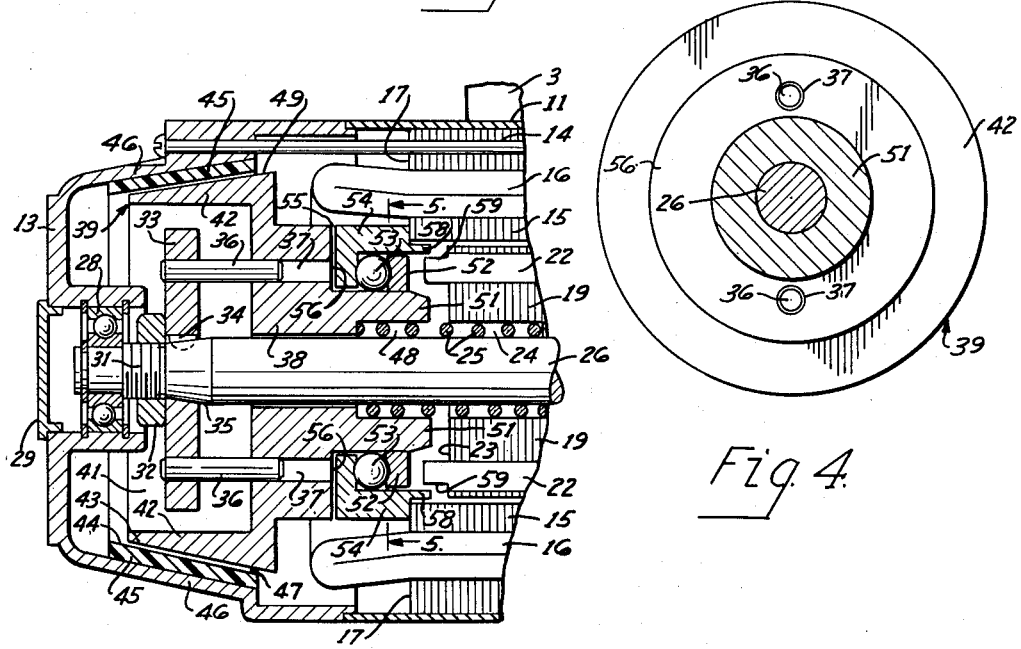
Fig. 3
Fig. 4
INVENTOR.
ANTHONY J. SORCHY
BY Bosworth, Sessions,
Herrstrom & Knowles
ATTORNEYS.

United States Patent Office 3,028,512
Patented Apr. 3, 1962

3,028,512
DRIVE RELEASED MOTOR BRAKE
Anthony J. Sorchy, Cleveland, Ohio, assignor to Manning, Maxwell & Moore, Inc., Muskegon, Mich., a corporation of New Jersey
Filed July 9, 1958, Ser. No. 747,516
6 Claims. (Cl. 310—77)

This invention relates to a motor brake, particularly a motor brake for a hoist or the like.

Hoists of the types commonly used to support heavy loads are usually provided with separate load brakes, notwithstanding the fact that the motor by which the hoist is operated may have a brake of its own. In general, the brake associated with the motor has not been sufficiently effective, particularly with heavy loads, to permit of the elimination of the load brake. Even with two brakes there has usually been an objectionable "drift" of the load; that is to say, a tendency on the part of the load to settle lower. Also, "inching" of the load by the operator has not been feasible; in other words, the operator has had to approximate rather roughly the position desired for the load and has not been able to approach the intended final position in incremental fashion. A common objection to installations of this kind has been the tendency of the load to swing or manifest a pendulum-like action, requiring manual dampening if it is to be brought to rest in a reasonable time.

It is a principal object of the present invention to provide a brake motor incorporating a brake mechanism that is sufficiently powerful, rugged and foolproof to permit of the elimination of the load brake commonly used with the hoist, particularly heavy-duty hoists of types that must be employed where heavy loads are involved. A further object of the invention is to provide a brake motor which may be used not only with heavy duty hoists, but also with hoists intended for lighter service. Still a further object of the invention is to provide a brake motor which can be used in a variety of installations, not merely hoists, to provide effective braking action on the unit operated by the motor shaft, as, for example, in a machine tool.

The invention further has as an object to provide a brake for a dynamo-electric machine characterized by simplicity, sturdiness and lack of any need for adjustment to compensate for wear. An important feature of the invention is the fact that it makes for a dynamo-electric machine of short overall length, due largely to the fact that in considerable degree there can be a telescoping of slidable and non-slidable components. A further feature of the invention is the inclusion of a pole piece that is designed, constructed and arranged to move into contact with and to bear against the stator under certain conditions of operation, particularly when the dynamo-electric machine takes the form of a motor. Still a further feature of the invention is the relatively short stroke of the plunger means of which the pole piece forms part, thereby making for prompt movement of the plunger means between brake-set and brake-released positions and vice versa.

Other objects, advantages and features of the invention will be apparent from the description which follows and from the accompanying drawings, in which:

FIGURE 2 is a vertical central section through the brake motor of the present invention when in brake-set position, the section being taken axially.

FIGURE 3 is a partial section similar to that of FIGURE 2 showing the brake motor in a brake-released position.

FIGURE 4 is a section through the plunger means taken on line 4—4 of FIGURE 2.

Figures 1, 5:
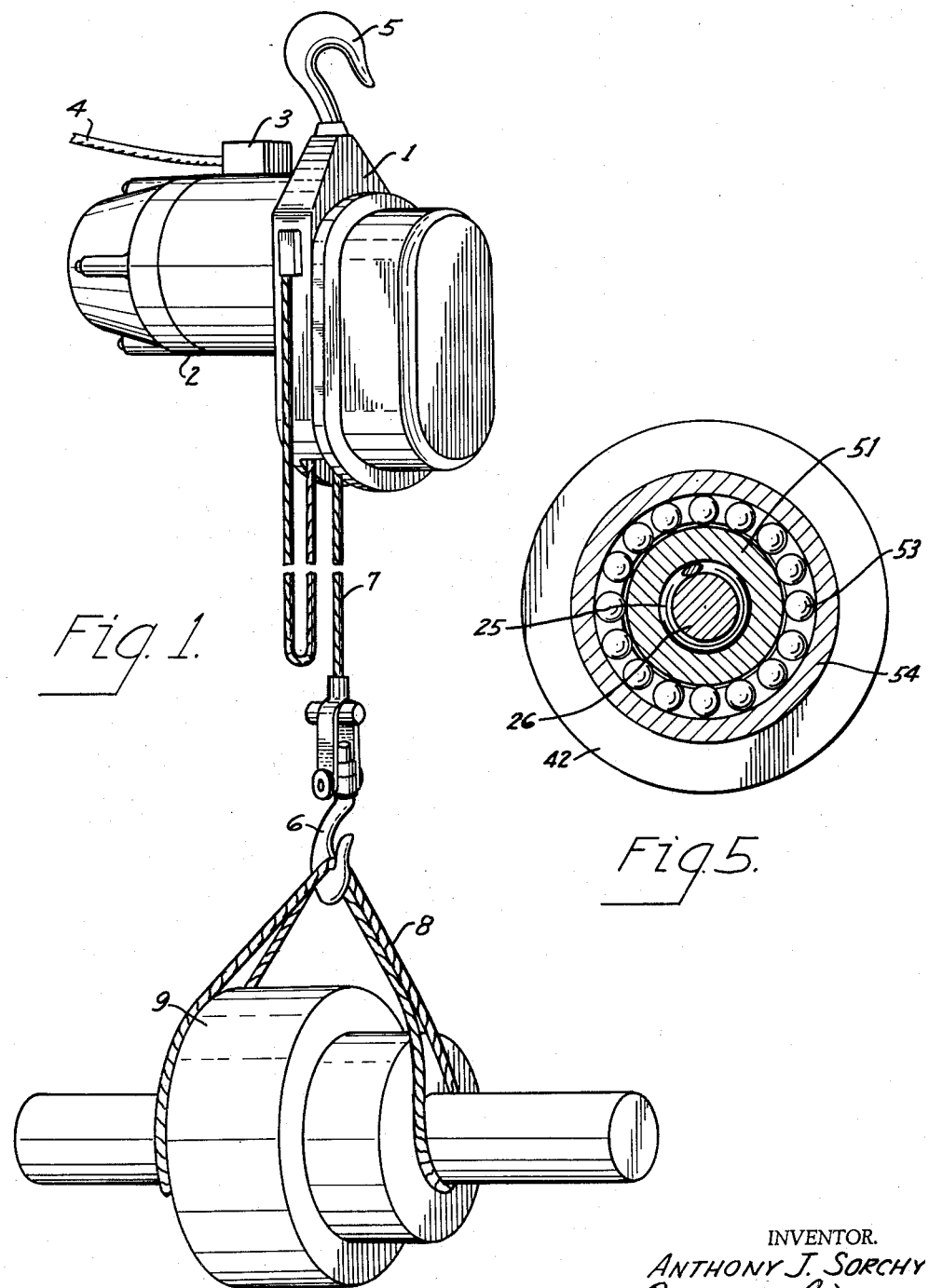
FIGURE 1 is a perspective of a heavy-duty hoist operated by the brake motor of the present invention without making use of a separate load brake.
FIGURE 5 is a section through the plunger means taken on line 5—5 of FIGURE 3.

In FIGURE 1 is shown a heavy-duty hoist 1 without a separate load brake to which is mechanically coupled the brake motor 2 of the present invention. Surmounting the latter is a conduit box 3 through which power is supplied to the motor from leads in cable 4. Hoist 1 is provided with two hooks 5 and 6, the former a suitably supported upper hook and the latter the conventional lower hook carried by the end of load cable 7. In the arrangement illustrated in FIGURE 1, a metal sling 8 is used to support load 9. The latter is of such size and weight as normally to call for the use of a separate load brake, particularly if lifted by a typical hoist of one of the kinds heretofore known.

Referring now to FIGURES 2 and 3, it will be seen that brake motor 2 includes suitable supporting structure consisting, in the embodiment of the invention shown, of motor housing 11, a flat end piece 12 at one end, and, at the other end, an end piece 13 of the nature of an end bell. Tie rods 14, of which there are three or more spaced at angles of not more than 120° around the periphery of the motor, serve to hold end pieces 12 and 13 in place on housing 11. Within housing 11 and end pieces 12 and 13 is a stator 15 having a field winding 16 that projects axially through end laminae 17 and 18.

At the left hand end of stator 15, seen as in FIGURE 2, the stator overhangs rotor 19, thus forming an annular chamber 21. It will be noted that rotor 19 is recessed at 24 to form a pocket for coil spring 25, which closely surrounds the shaft 26 to which rotor 19 is affixed. Shaft 26 is mounted at its right hand end in an anti-friction bearing assembly 27 and at its left hand end in an anti-friction bearing assembly 28, both of conventional construction. Access to the latter may be had by removing cover disk 29.

Near the zone in which it is supported by bearing assembly 28, shaft 26 is threaded as at 31 to accommodate a nut 32 that is used to hold an annular retainer 33 in position on shaft 26. Shaft 26 and retainer 33 are keyed together by a key 34. Retainer 33 has a frusto-conical central opening which conforms in shape to a frusto-conical portion 35 on shaft 26. Thus when nut 32 is brought to bear against retainer 33, the latter seats firmly on frusto-conical portion 35. Angular slippage between them is prevented by key 34.

Extending forwardly from retainer 33 toward rotor 19 are two or more studs 36 of the nature of driving pins the free ends of which are received in circular bores 37 of slightly larger diameter in the body or plunger portion 38 of the plunger means 39 to be described hereinafter. Rotor 19 and shaft 26 turn about their common longitudinal axis under the influence of the electro-magnetic field generated in the motor. By virtue of the presence of retainer 33 and drive pins 36, plunger means 39 turn in the same direction and at the same angular speed as shaft 26. However, as will appear, plunger means 39 are permitted a limited amount of sliding movement on the surface of the shaft on which they ride with a clearance of a few thousandths of an inch. It will be noted that retainer 33 is telescoped within and accommodated in its entirety by the chamber 41 at the trailing end of plunger means 39, thus cutting down the overall length.

Among other things, plunger means 39 include the rearwardly directed sleeve 42 in which chamber 41 is formed. This sleeve, which constitutes a first or movable brake element, is characterized by a frusto-conical braking surface 43. The latter is designed to co-act with a complementary frusto-conical braking surface 44 forming part of a sleeve-like lining 45 constituting part of a second or fixed brake element. Lining 45 is made up of trapezoidal segments of conventional brake lining material that are glued to the inside surface of the generally frusto-conical portion 46 of end bell 13. This construction is found also in the brake motor described in prior application Serial No. 726,120, filed April 3, 1958, for "Motor Brake."

When the brake motor is now braking, surface 43 on rearwardly directed sleeve 42 will usually register with braking surface 44 on sleeve-like lining 45 so long as the parts are in the brake-set position shown in FIGURE 2. When, due to excitation of the motor, the plunger or body portion 38 of plunger means 39 is retracted in the manner hereinafter explained, a clearance 47 opens up between the first and second brake elements: see FIGURE 3. Thus major portions of plunger means 39 are freed to rotate about the axis of shaft 26 without interference from shaft 26 or from the sleeve-like lining 45 on end bell 13.

From FIGURES 2 and 3 it will be noted that the plunger or body portion 38 of plunger means 39 is recessed at 48 to accommodate the end of coil spring 25, which biases plunger means 39 toward brake-set position. Spring 25 tends to urge plunger means 39 increasingly to the left as the sleeve-like lining 45 wears down, thus compensating for wear. As the lining wears down, the length of the stroke of course increases slightly, but not enough to make any material difference in the operation of the brake motor. At the outset, the length of the stroke is approximately 3/16". This is about equal to the non-registering or brake-released length of the surface 49 at the forward end of rearwardly directed sleeve 42: see FIGURE 3. No provision needs to be made for adjusting the movable brake element in relation to the fixed brake element, none being necessary in view of the fact that compensation for wear takes place automatically.

Whereas plunger means 39 have at their trailing end the rearwardly directed sleeve 42, which is of fairly large diameter, plunger means 39 have at their leading end a forwardly directed sleeve 51 of fairly small diameter. A stationary collar 52 is mounted by a shrink fit on forwardly directed sleeve 51. Collar 52 serves as a retainer for a series of anti-friction elements 53 located between the collar and an annular pole piece 54 formed as shown in FIGURES 2, 3 and 5. In effect, forwardly directed sleeve 51 constitutes the inner race and pole piece 54 constitutes the outer race of an anti-friction bearing assembly. A clearance 55, not less than about five-thousandths of an inch, intervenes between pole piece 54 and the radially extending shoulder 56 on the plunger or body portion 38 of plunger means 39. By virtue of this construction, pole piece 54 needs not necessarily turn with the plunger or body portion 38 of plunger means 39.

At the forward end of pole piece 54 is a radially extending shoulder 57 circumscribing a forwardly directed lip 58. When the parts are in the brake-released position, shoulder 57 seats against end lamina 17 of stator 15: compare FIGURES 2 and 3. To accommodate lip 58, core piece 22 is cut away as indicated at 59. The purpose of lip 58 is to provide a leader on which the electromagnetic field of the motor can operate at the outset. Attracted by the action of the electro-magnetic field on lip 58, pole piece 54 moves into and is held in place against stator 15 so long as the parts are required to be in brake-released position (FIGURE 3).

The parts making up the brake assembly occupy the brake-set position shown in FIGURE 2 when the motor is de-energized, at which time annular chamber 21 in stator 15 is largely unobstructed. When, however, the motor is energized, a strong pull is immediately exerted by the electromagnetic field of the motor on plunger means 39, particularly lip 58 of pole piece 54. As a result thereof, the forwardly directed sleeve 51 forming part of plunger means 39 moves into annular chamber 21; at the same time, pole piece 54 is urged into intimate engagement with end lamina 17 of stator 15. It is during this time that clearance 47 opens between the fixed and movable brake elements.

During operation, pole piece 54 remains stationary in fixed engagement with stator 15. By virtue of the presence of the anti-friction bearing assembly provided as above described, the plunger or body portion of plunger means 39 rotates freely, putting no especial drag on the operation of the motor. When the motor is de-energized, the electro-magnetic field of the motor rapidly disappears, whereupon spring 25 returns plunger means 39 and pole piece 54 to the position shown in FIGURE 2. At this stage, assisted by spring 25, the large braking area provided by the fixed and movable brake elements provides a firm grip on plunger means 39 and thus on shaft 26 and rotor 19.

In general the components of the brake other than the brake lining material will be of metal, although the possibility of using non-metals for certain of the components is not precluded. Parts that are intimately identified with shaft 26, such as nut 32, retainer 33, key 34 and studs 36, will in general be of hard steel. The pole piece should be of a high quality ferromagnetic metal such as one of the metals commonly used in solenoid plungers, although it may, if desired, be made of a less expensive material such as cast iron. The plunger means, including both forwardly and rearwardly directed sleeves and the plunger or body portion thereof, may be of a relatively light metal such as aluminum or an aluminum-magnesium alloy, although the use of cast iron is not foreclosed. The other parts; e.g., spring 25, collar 52 and bearing balls 53, will in general be of high quality steel.

In an installation of this kind, there is no appreciable slippage between the parts when the brake is in brake-set position. Thus even though the weight of the load 9 shown in FIGURE 1 may be excessive, there is no drift of the load, notwithstanding the absence of any separate load brake in the hoist. The very short stroke of plunger means 39 makes for very prompt response to energization and de-energization of the motor. As a result, it is possible to "inch" the load to a higher or lower position, as desired. Free swinging pendulum action of the kind characteristic of so many hoists, particularly of hoists of the heavy duty type, is rarely encountered in installations of the kind hereinabove described.

It is evident that changes may be made by those skilled in the art without departing from the spirit of the invention. Thus it is possible to use an anti-friction bearing assembly of a different type in lieu of the ball-bearing assembly formed by bearing balls 53, forwardly directed sleeve 51 and pole piece 54. For example, roller bearings or, if desired, tapered bearings may be used. Also it is evident that the parts may be rearranged to extend pole piece 54 rearwardly to embrace that portion of plunger means 39 which carries rearwardly directed sleeve 42. In such case, rearwardly directed sleeve 42 naturally would not turn with the plunger or body portion of plunger means 39, as contemplated in the embodiment of the invention illustrated in the drawings. Other changes of similar nature may be expected of those skilled in the art.

It is intended that the patent shall cover, by summarization in appended claims, all features of patentable novelty residing in the invention.

What is claimed is:

1. In a dynamo-electric machine, supporting structure; a stator, a rotor and a shaft carried by the supporting structure; fixedly mounted braking means within the supporting structure; movable braking means in apposition to the fixedly mounted braking means; plunger means by which the movable braking means are carried, said plunger means being rotatable with the shaft; a first race forming part of the plunger means; a second race loosely mounted on the plunger means and attracted by the stator when the machine is energized; anti-friction elements in engagement with the first race and the second race; and resilient means biasing the plunger means toward the position occupied by the plunger means when the dynamo-electric machine is de-energized.

2. In a dynamo-electric machine, supporting structure; a stator, a rotor and a shaft carried by the supporting structure; fixedly mounted braking means within the supporting structure; movable braking means in apposition to the fixedly mounted braking means; plunger means by which the movable braking means are carried, said plunger means being rotatable with the shaft; means forming a chamber in the movable braking means, said chamber being disposed outwardly of the main portion of the plunger means; a retainer on the shaft, said retainer occupying part of the chamber in the movable braking means; and driving means coupling the retainer to the proximate end of the main portion of the plunger means by way of a sliding fit.

3. A dynamo-electric machine according to claim 2 in which the driving means take the form of one or more studs on the retainer.

4. A dynamo-electric machine according to claim 3 in which the studs on the retainer extend into outwardly directed openings in the main portion of the plunger means.

5. In a dynamo-electric machine, the subcombination consisting of a plunger; means by which the plunger may be supported; means at one end of the plunger forming a brake element; and, at the other end of the plunger, means forming a bearing assembly of the anti-friction type, said bearing assembly comprising an inner race carried by the plunger, an outer race loosely carried by the inner race, and a series of anti-friction elements between the two races, each of said races having the shape of a right angle whereby said elements are enclosed by four sides.

6. In a dynamo-electric machine, supporting structures; a stator, a rotor and a shaft carried by the supporting structure; fixedly mounted braking means within the supporting structure; movable braking means in apposition to the fixedly mounted braking means; plunger means by which the movable braking means are carried, said plunger means being rotatable with the shaft; a first race forming part of the plunger means; a second race loosely mounted on the plunger means; means on the second race adapted to seat against the proximate end of the stator when the dynamo-electric machine is energized; anti-friction elements in engagement with the first race and the second race; and resilient means biasing the plunger means toward the position occupied by the plunger means when the dynamo-electric machine is de-energized.

References Cited in the file of this patent

FOREIGN PATENTS

| | | |
|---|---|---|
| 687,644 | Germany | Feb. 2, 1940 |
| 756,984 | Germany | Oct. 2, 1952 |
| 704,914 | Great Britain | Mar. 3, 1954 |
| W15887 | Germany | May 30, 1956 |